(12) United States Patent
Liu et al.

(10) Patent No.: US 12,263,854 B2
(45) Date of Patent: Apr. 1, 2025

(54) DOUBLE INDEPENDENT CONTROL UNIT-BASED INTELLIGENT VEHICLE CONTROL SYSTEM AND VEHICLE

(71) Applicant: SHARKGULF TECHNOLOGY (QINGDAO) CO., LTD., Qingdao (CN)

(72) Inventors: Ke Liu, Shanghai (CN); Hui Hu, Shanghai (CN)

(73) Assignee: SHARKGULF TECHNOLOGY (QINGDAO) CO., LTD, Qingdao (CN)

( * ) Notice: Subject to any disclaimer, the term of this patent is extended or adjusted under 35 U.S.C. 154(b) by 332 days.

(21) Appl. No.: 17/793,754

(22) PCT Filed: Jan. 10, 2021

(86) PCT No.: PCT/CN2021/071001
§ 371 (c)(1),
(2) Date: Jul. 19, 2022

(87) PCT Pub. No.: WO2021/143630
PCT Pub. Date: Jul. 22, 2021

(65) Prior Publication Data
US 2023/0105038 A1    Apr. 6, 2023

(30) Foreign Application Priority Data
Jan. 19, 2020    (CN) .................. 202010057099.4

(51) Int. Cl.
*B60W 50/10*    (2012.01)
*B60W 50/14*    (2020.01)

(52) U.S. Cl.
CPC ............ *B60W 50/10* (2013.01); *B60W 50/14* (2013.01); *B60W 2050/146* (2013.01); *B60W 2300/36* (2013.01); *B60W 2554/4041* (2020.02)

(58) Field of Classification Search
CPC .............. B60W 50/10; B60W 50/14; B60W 2050/146; B60W 2300/36; B60W 2554/4041
See application file for complete search history.

(56) References Cited

U.S. PATENT DOCUMENTS

2016/0321146 A1* 11/2016 Makino ............... G06F 11/3058
2019/0135303 A1   5/2019 Kim et al.
(Continued)

FOREIGN PATENT DOCUMENTS

| CN | 104036778 A | * | 9/2014 | |
| CN | 109677410 A | * | 4/2019 | .......... B60W 30/182 |

(Continued)

OTHER PUBLICATIONS

Translation of CN1096774.*
(Continued)

*Primary Examiner* — Kenneth J Malkowski
(74) *Attorney, Agent, or Firm* — Maier & Maier, PLLC (57) ABSTRACT

The present application pertains to the technical field of vehicles, and in particular to a vehicle intelligent control system based on a dual independent control system and a corresponding vehicle. The system includes a locomotive terminal and a cloud server. The locomotive terminal includes a first control system and a second control system both being operable independently and capable of exchanging data with each other in real time. The first control system monitors an operation state of the vehicle in real time and transmits at least part of operation state data to the second control system in real time, and controls an operation of the vehicle according to an internal preset instruction and a control instruction received from the second control system. The second control system receives data transmitted by the first control system and transmits at least part of the received data to the cloud server, and receives a control instruction
(Continued)

from the cloud server and forwards the control instruction for controlling the operation of the vehicle to the first control system. The present application improves the adaptability and stability of the system, enhances the user experience and increases the safety of the vehicle.

16 Claims, 6 Drawing Sheets

(56) References Cited

U.S. PATENT DOCUMENTS

| | | | |
|---|---|---|---|
| 2021/0201854 A1* | 7/2021 | Babu | G09G 5/373 |
| 2022/0343758 A1* | 10/2022 | Liu | H04L 67/10 |

FOREIGN PATENT DOCUMENTS

| | | |
|---|---|---|
| CN | 109808611 A | 5/2019 |
| CN | 111176109 A | 5/2020 |
| CN | 111216832 A | 6/2020 |
| CN | 111246380 A | 6/2020 |
| CN | 111301573 A | 6/2020 |
| CN | 111312262 A | 6/2020 |
| CN | 111371875 A | 7/2020 |

OTHER PUBLICATIONS

Translation of CN104036778.*
International Search Report (with English Translation) and Written Opinion (with Machine Translation) issued on Apr. 1, 2021 in corresponding International Patent Application No. PCT/CN2021/071001; 19 pages.

* cited by examiner

DOUBLE INDEPENDENT CONTROL UNIT-BASED INTELLIGENT VEHICLE CONTROL SYSTEM AND VEHICLE

The present application claims priority to Chinese Patent Application No. 202010057099.4, filed on Jan. 19, 2020 and entitled "VEHICLE INTELLIGENT CONTROL SYSTEM BASED ON DUAL INDEPENDENT CONTROL SYSTEM, AND VEHICLE", which is hereby incorporated for reference in its entirety.

TECHNICAL FIELD

The present application pertains to the technical field of vehicles, and in particular to two-wheeled vehicles. The two-wheeled vehicles in the present application are electric bicycles, motorcycles, electric motorcycles, electric scooters, etc. that are used as means of transportation. However, the technical solution of the present application is also applicable to other vehicles such as three-wheeled vehicles and four-wheeled vehicles that need to be intelligently controlled.

BACKGROUND

Electric two-wheeled vehicles are powered by batteries. For safe and stable operation of key components such as electric motors and batteries, an electronic control unit is usually required to control all of these components. For example, the output of a voltage and a current of a battery is controlled, a rotational speed or input power of a motor is adjusted, and functions such as anti-theft and environmental state monitoring are implemented. However, the existing electronic control unit has few functions for human-machine interaction and does not support remote monitoring or remote access of the vehicle by a user.

With the development of communications technologies and Internet of Things technologies, the vehicle also gradually becomes a node for the Internet of Everything. It is possible for people to remotely monitor the operation state of the vehicle via a mobile client, and achieve functions such as an anti-theft reminder and remote management. In order to achieve these functions, it is required to improve a control system of the vehicle and provide additional function modules for remote communication, intelligent control, pattern recognition, positioning, alarm, etc. However, due to the low scalability of the existing vehicle electronic control unit (ECU), it is difficult to adapt to the increasing demand for new intelligent applications; in addition, the expansion functions added to the ECU increase the consumption of ECU resources, and occupy the resources of the original vehicle control functions, and the complex functions also reduce the safety of driving control.

Therefore, there is a great need in the industry for a vehicle intelligent control system that is suitable for remote access and intelligence with stable operation, strong scalability, and a high fault tolerance rate and that is especially suitable for electric two-wheeled vehicles.

SUMMARY (I) Technical Problems to be Solved

The present application is intended to solve problems of single function, weak scalability, poor stability, low fault tolerance and low safety of an existing vehicle intelligent control system.

(II) Technical Solutions

To solve the above technical problems, one aspect of the present application proposes a vehicle intelligent control system based on a dual independent control system. The vehicle intelligent control system includes a locomotive terminal and a cloud server both exchanging information with each other. The locomotive terminal includes a first control system and a second control system both being operable independently and capable of exchanging data with each other in real time. The first control system monitors an operation state of a vehicle in real time and transmits at least part of operation state data to the second control system in real time, and the first control system controls an operation of the vehicle according to an internal preset instruction and a control instruction received from the second control system. The second control system receives data transmitted by the first control system and transmits at least part of the received data to the cloud server, and the second control system receives a control instruction from the cloud server and forwards the control instruction for controlling the operation of the vehicle to the first control system.

In one embodiment, the vehicle intelligent control system further includes a user terminal. The user terminal can also exchange information with the cloud server, and the cloud server is further configured to transmit a control instruction from the user terminal to the second control system.

In one embodiment, the second control system transmits the operation state data obtained to the cloud server; and the user terminal connected to the cloud server obtains the operation state data to display a current operation state of the vehicle on the user terminal in real time.

In one embodiment, the first control system includes a first electronic control unit, and the second control system includes a second electronic control unit, where the first electronic control unit exchanges data with the second electronic control unit in real time; and the first electronic control unit controls driving of the vehicle independent of data transmitted by the second electronic control unit.

In one embodiment, the second control system includes a display module provided in the vehicle for displaying the operation state data.

In one embodiment, the second control system further controls a display of the display module according to control instructions from the cloud server and/or user's operating instructions.

In one embodiment, the second control system includes a positioning module provided in the vehicle for obtaining geographic position information of the vehicle; and the display module is further configured to display the geographic position information.

In one embodiment, the second control system transmits the geographic position information to the cloud server; and a user terminal connected to the cloud server obtains the geographic position information for displaying a geographic position of the vehicle in real time.

In one embodiment, the first control system further includes a sensor for obtaining the operation state data of the vehicle, and the first electronic control unit controls the operation of the vehicle based on the operation state data obtained by the sensor.

In one embodiment, the first electronic control unit is further configured to transmit to the second electronic control unit original data obtained by the sensor or aggregated data obtained after processing the original data; and the second electronic control unit is further configured to transmit to the cloud server data obtained by itself and/or data from the first electronic control unit.

In one embodiment, the vehicle intelligent control system further includes: a smart helmet, the second electronic control unit being capable of exchanging data with the smart helmet to transmit data obtained from the first control system, the second control system and/or the cloud server to the smart helmet; and the smart helmet being configured to display and/or play the obtained data.

In one embodiment, the smart helmet includes a projection module for visually displaying information from the second electronic control unit.

In one embodiment, the second electronic control unit includes a restart control module and an application operation module; the application operation module is configured to store, install and operate various applications; and the restart control module is configured to control the application operation module to restart automatically.

In one embodiment, the restart control module includes a first data storage module; and data reported by the first electronic control unit to the second electronic control unit or control instructions transmitted by the cloud server to the second electronic control unit are cached in the first data storage module and then transmitted by the restart control module to the application operation module.

In one embodiment, the first electronic control unit is connected to at least one of following modules: a sensing control module, a human-machine interaction module and an identification module.

In one embodiment, the sensing control module is connected to a battery management module, and the battery management module is configured to control a battery system of the vehicle.

Another aspect of the present application further provides a vehicle, including a vehicle body and a vehicle control system. The vehicle control system includes a first control system and a second control system both being operable independently and capable of exchanging data with each other in real time. The first control system monitors an operation state of a vehicle in real time and transmits at least part of operation state data to the second control system in real time, and the first control system controls an operation of the vehicle according to an internal preset instruction and a control instruction received from the second control system. The second control system receives data transmitted by the first control system and transmits at least part of the received data to a cloud server, and the second control system receives a control instruction from the cloud server and forwards a control instruction for controlling the operation of the vehicle to the first control system.

In one embodiment, the first control system includes a first electronic control unit, the second control system includes a second electronic control unit, the first electronic control unit exchanges data with the second electronic control unit in real time; and the first electronic control unit controls driving of the vehicle independent of data transmitted by the second electronic control unit.

In one embodiment, the second control system includes a display module provided in the vehicle for displaying the operation state data.

In one embodiment, the second control system further controls a display of the display module according to control instructions from the cloud server and/or user's operating instructions.

In one embodiment, the second control system includes a positioning module provided in the vehicle for obtaining geographic position information of the vehicle; and the display module is further configured to display the geographic position information.

In one embodiment, the second control system transmits the geographic position information to the cloud server.

In one embodiment, the first control system further includes a sensor for obtaining the operation state data of the vehicle, and the first electronic control unit controls the operation of the vehicle based on the operation state data obtained by the sensor.

In one embodiment, the first electronic control unit is further configured to transmit to the second electronic control unit original data obtained by the sensor or aggregated data obtained after processing the original data; and the second electronic control unit is further configured to transmit to the cloud server data obtained by itself and/or data from the first electronic control unit.

In one embodiment, the second electronic control unit includes a restart control module and an application operation module; the application operation module is configured to store, install and operate various applications; and the restart control module is configured to control the application operation module to restart automatically.

In one embodiment, the restart control module includes a first data storage module; and data reported by the first electronic control unit to the second electronic control unit or control instructions transmitted by the cloud server to the second electronic control unit are cached in the first data storage module and then transmitted by the restart control module to the application operation module.

(III) Beneficial Effects

By the designed architecture of the dual independent control system in the present application, it makes intelligent, remote-controlled, network-based interconnected intelligent applications isolated from the bottom-layer control system of the vehicle, to improve the safety of the vehicle.

The present application designs an automatic restart of the top-layer control system, to make the overall system more adaptable and stable, and to improve the user experience.

The top-layer control system of the present application has an independent operation platform and can be more intelligently expanded, to solve the problem of single function and weak scalability.

DETAILED DESCRIPTION OF THE EMBODIMENTS

In the description of specific embodiments, the details of the structure, performance, effect or other features are described for those skilled in the art to fully understand the embodiments. However, it is not excluded that those skilled in the art may implement the present application in a particular case with a technical solution that does not contain the structure, performance, effect, or other features described above.

The flowchart in the drawings is only an example process demonstration and does not mean that all of the contents, operations and steps in the flowchart must be included in the embodiment of the present application, nor that they must be performed in order shown in the drawings. For example, some operations/steps in the flowchart may be split, some operations/steps may be combined or partially combined, and so on, and the order of execution shown in the flowchart may be changed to suit the actual situation without departing from the inventive essence of the present application.

The block diagram in the drawings generally represents a functional entity and does not necessarily correspond to a physically separate entity. That is, the functional entity may be implemented by software, or in one or more hardware modules or integrated circuits, or in different network and/or processing unit apparatuses and/or microcontroller apparatuses.

The same reference numeral in the drawings denotes the same or similar elements, components, or parts, and thus repetitive descriptions of the same or similar elements, components, or parts may be omitted below. It should also be understood that while the attribute such as first, second, third, etc. representing number may be used herein to describe various devices, elements, components, or parts, these devices, elements, components, or parts should not be limited by such attributes. That is, these attributes are only used to distinguish one from another. For example, a first device may also be referred to as a second device, without departing from the substantial technical solution of the present application. In addition, the terms "and/or" refer to all combinations including any one or more of the listed items.

The present application proposes a vehicle intelligent control system having an innovative architecture. In general, the system is based on a cloud interconnection and interaction mode, i.e. The system includes a cloud server, which exchanges information with each locomotive terminal, to form a network of connected vehicles including the locomotive terminal and the cloud server. The locomotive terminal can be any vehicle that can exchange data remotely, including electric bicycles, motorcycles, electric motorcycles, electric scooters, etc., and can also be various vehicles of fuel-powered, pure electric, fuel cell, hybrid automobiles, three-wheeled vehicles, motorcycles, bicycles, etc. Certainly, for the expansion of functions, the network of connected vehicles can be connected to other terminals in addition to the locomotive terminal, including the user's mobile terminal and other device terminals working together with the locomotive, such as batteries, battery chargers, charging piles, smart helmets, etc.

In order to solve problems of unstable operation, weak scalability and poor fault tolerance of the electronic control unit of the vehicle in the prior art in terms of intelligent application expansion, the locomotive terminal of the present application adopts an architecture of a dual independent control system, that is, the locomotive terminal includes a first control system and a second control system, which can exchange data in real time. The first control system may also be referred to as a bottom-layer control system, and its basic functions refer to control functions of the existing vehicle, including real-time monitoring of the operation state of the vehicle and controlling the operation of the vehicle, and receiving a control instruction from the second control system to realize the functions of intelligent applications. The second control system, which may also be referred to as a top-layer control system, is mainly used to access a network of connected vehicles for data exchange, and is also used to implement direct information exchange (including controlling the display device to display the vehicle's operation status, information exchange with the smart helmet, etc.) between the locomotive terminal and the user.

In order to realize the functions in terms of intelligent applications based on remote control, the first control system and the second control system need to exchange data. Specifically, the first control system needs to transmit at least part of operation state data of the vehicle to the second control system in real time, and the first control system can also control the operation of the vehicle according to an internal preset instruction and a control instruction received from the second control system. In addition, the second control system receives the data transmitted by the first control system and can transmit at least part of the received data to a cloud server, and the second control system can also receive a control instruction from the cloud server and forward the control instruction therein for controlling the operation of the vehicle to the first control system.

It should be noted that the specific data or control instructions to be exchanged between the first control system and the second control system, and between the second control system and the cloud server in the present application can be designed differently depending on the specific type, application function, application environment, etc. of the vehicle, but should not be used as a limitation on the present application.

It should be further emphasized that the first control system and the second control system in the present application can operate independently. The independent operation in the present application means that the normal operations of basic operation modes of the first control system do not depend on those of the second control system. Specifically, the basic locomotive control of the first control system as the bottom-layer control system is not affected even when the second control system does not operate normally, except that the first control system cannot obtain a control instruction from the second control system or transmit operation state data of the vehicle to the second control system in real time. However, the control instruction that cannot be obtained and the state data that cannot be transmitted do not affect the first control system for the basic driving control of the vehicle. In addition, the basic network interconnection of the second control system as a top-layer control system is not affected even when the second control system does not operate normally, except that the second control system cannot obtain a real-time operation state of the vehicle from the first control system or transmit an additional external control instruction to the first control system.

As described above, the network of connected vehicles of the present application is also accessed by other terminals. In one implementation, the vehicle intelligent control system of the present application further includes a user terminal, which can also exchange information with the cloud server. The cloud server can further transmit a control instruction from the user terminal to the second control system. In this way, the second control system can receive the control instruction from the user terminal and forward a control instruction that needs to be processed by the first control system to the first control system for remote control applications, such as remote locking for anti-theft.

The second control system can also transmit the operation state data of the vehicle, including various operation state data of the vehicle, from the first control system to the cloud server. It should be noted that the operation state herein includes an environmental state of the vehicle, a state of the whole vehicle, a state of each component, a state of the vehicle when driving, and a state of the vehicle in various modes such as shutdown without starting, starting without traveling, etc.

In one embodiment, the first control system includes a sensing control module, which is used to obtain various real time vehicle state information of the vehicle, including a remaining battery level, a driving speed, etc. The first control system can transmit the various information obtained by the sensing control module to the second control system, and then the second control system transmits the various information to the cloud server. In this way, an authorized user terminal connected to the cloud server can obtain real-time state information of the vehicle in real time, and the vehicle can be monitored in real time on the cellphone, such as real time monitoring of the battery level.

In one embodiment, the vehicle of the present application has a display apparatus, which includes a display screen and a display module for controlling the display content. The second control system includes the display module. The display apparatus can display information such as data (navigation data, etc.) or control instructions (connection instructions, etc.) received from the first control system. More importantly, the second control system can also receive and display state data of the vehicle from the first control system. In this case, the second control system controls the display module based on the state data of the vehicle received from the first control system to display the real-time operation state of the vehicle on the display apparatus.

In addition, the second control system may further include some function modules, such as a positioning module for displaying geographic position information of the detected vehicle, and the display module can display an electronic navigation map based on the geographic position information. The second control system can also upload the geographic position information to the cloud server, such that other user terminals connected to the cloud server can obtain the real-time geographic position information of the vehicle from the cloud server.

In addition, the display apparatus or display module of the present application can be used as the only display apparatus or display module of the vehicle, or can cooperate with the traditional mechanical instruments, electronic indicators, etc. For example, when the user driving the vehicle turns on a turn signal of the vehicle, a turn indicator light (such as a LED light) on the vehicle can light up accordingly, and a pattern or animation indicating the turning can be displayed on the display apparatus. At this time, the first control system detects that the turn signal of the vehicle is on, and then transmits the data indicating that the turn signal is on to the second control system. The second control system controls the display module to display corresponding patterns or animations according to the data. Further, the second control system can also transmit the data indicating that the turn signal is on to the cloud server, and the user terminal connected to the cloud server can obtain the data indicating that the turn signal is on in real time, so that the user terminal can display in real time that the turn signal of the vehicle is turned on.

Based on the above, in one embodiment, cellphones of users other than the driver, when authorized, can receive the geographic position information of the vehicle and the real-time state of each light of the vehicle that are uploaded by the second control system. An animation of the vehicle icon moving in the image of the map, including the state of each light of the vehicle, can be displayed on the cellphone in real time. Such a collaborative remote display method not only enables the remote user to know the operation state of the vehicle in detail, but also enhances the interestingness of the vehicle to the user and improves the user experience.

In addition, for the display module or display apparatus, the second control system can also control the display of the display module based on the user's operating instructions and/or control instructions from the cloud server. For example, in a case that the user suspects that the vehicle is stolen, the user can remotely operate to turn off the display apparatus or remotely operate the display apparatus to display a corresponding warning message, etc. For another example, other users (e.g., friends or family members of the driver), when authorized, can also transmit messages via the user terminal (cellphone), and the messages are forwarded by the the cloud server to be received by the second control system and displayed on the display apparatus or display module via control of the second control system. In addition, when the vehicle is connected to a matching smart helmet, the second control system can also transmit the message to the smart helmet, and text messages can be projected on the screen, or the second control system converts the text message into an audio message and then transmits the audio message to the smart helmet. The driver can directly hear the audio message converted by the text message; or the second control system directly forwards the audio message to the smart helmet, so that the driver can hear the audio message through the helmet.

Still further, in one embodiment, the first control system includes a first electronic control unit. The second control system includes a second electronic control unit. The first electronic control unit and the second electronic control unit can exchange data with each other in real time. Moreover, in order to achieve independent operations of the first control system and the second control system, the first electronic control unit controls the driving operation of the vehicle independent of the data transmitted from the second electronic control unit. The driving operation here means the operation of functional components related to the driving function of the vehicle. In other words, except that other operations such as the remote control require network interconnection functions, the first electronic control unit can operate independent of the operation of the second electronic control unit. In this way, the first electronic control unit can still perform basic driving control even if the second electronic control unit does not operate normally due to environmental changes (natural causes such as undercooling, overheating, impact, etc., and communication causes such as no signals). The stability and safety of the vehicle are thus improved.

Specifically, the first electronic control unit transmits original data obtained from the sensors or aggregated data obtained after processing the original data to the second electronic control unit. The second electronic control unit transmits the data from the first electronic control unit to the cloud server. As a result, the cloud server as a data center can obtain all the data uploaded by the locomotive terminal communicated therewith. The data can be modeled and processed to learn and utilize the user's driving preferences and the locomotive terminal's operation rules, to improve the control methods of the first control system and the second control system, to improve the intelligence control of the vehicle and greatly improve the user experience.

In one embodiment, in order to improve the stability of the system, it can be monitored whether the first electronic control unit and/or the second electronic control unit crash, and the electronic control units when crashing are controlled to restart.

In one embodiment, the second electronic control unit is provided with a restart control module (e.g., an MCU) and an application operation module, and the restart control module monitors in real time whether the application operation module of the second electronic control unit crashes, and when crashing, controls the application operation module to restart.

Further, the restart control module includes a first data storage module, and the data reported by the first electronic control unit or the control instructions transmitted by the cloud server are first cached in the restart control module and then transmitted to the application operation module.

If the restart control module detects that the application operation module crashes, when the application operation module is in a crashing state or in the process of restarting, and the second electronic control unit receives the data reported by the first electronic control unit or the control instructions from the cloud server, the restart control module caches the reported data or the transmitted control instruction in the first data storage module (e.g., a RAM). When the application operation module starts normally, the restart control module re-transmits the data in the first data storage module to the application operation module.

The above automatic restart of the second electronic control unit is also applicable to the first electronic control unit, which will not be repeated herein.

In order to make the objects, technical solutions and advantages of the present application more clearly understood, the present application is described below in further detail with reference to specific embodiments and the drawings.

In the description of the specific embodiments, the details of the structure, performance, effect or other features are described for those skilled in the art to fully understand the embodiments. However, it is not excluded that those skilled in the art may implement the application in a particular case with a technical solution that does not contain the above structure, performance, effect or other features.

The flowchart in the drawings is only an example process demonstration and does not mean that all of the contents, operations and steps in the flowchart must be included in the embodiment of the present application, nor that they must be performed in order shown in the drawings. For example, some operations/steps in the flowchart may be split, some operations/steps may be combined or partially combined, and so on, and the order of execution shown in the flowchart may be changed to suit the actual situation without departing from the inventive essence of the present application.

The block diagram in the drawings generally represents a functional entity and does not necessarily correspond to a physically separate entity. That is, the functional entity may be implemented by software, or in one or more hardware modules or integrated circuits, or in different network and/or processing unit apparatuses and/or microcontroller apparatuses.

The same reference numeral in the drawings denotes the same or similar elements, components, or parts, and thus repetitive descriptions of the same or similar elements, components, or parts may be omitted below. It should also be understood that while the attribute such as first, second, third, etc. representing number may be used herein to describe various devices, elements, components, or parts, these devices, elements, components, or parts should not be limited by such attributes. That is, these attributes are only used to distinguish one from another. For example, a first device may also be referred to as a second device, without departing from the substantial technical solution of the present application. In addition, the terms "and/or" refer to all combinations including any one or more of the listed items.

Figure 1:
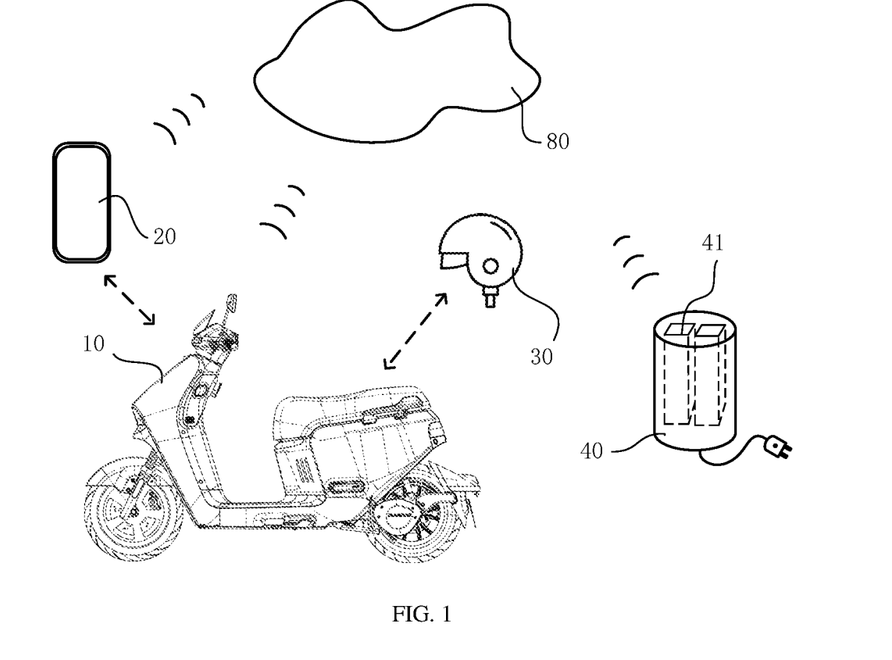
FIG. 1 is a schematic diagram of an application scenario of an electric two-wheeled vehicle to which a vehicle intelligent control system based on a dual independent control system of the present application is applied.

FIG. 1 is a schematic diagram of an application scenario of an electric two-wheeled vehicle to which a vehicle intelligent control system based on a dual independent control system of the present application is applied.

As shown in FIG. 1, in this example application scenario, a locomotive terminal is installed on an electric motorcycle 10 and can exchange data with a cloud server 80 via a mobile communication network. The electric motorcycle 10 can also communicate with a cellphone 20 and a smart helmet 30. The cellphone 20 as a mobile terminal can also exchange data with the cloud server 80 via the mobile communication network. In addition, the electric motorcycle 10 is fitted with a battery 41, and the battery 41 can be removed and placed in a battery-specific charging device 40 for charging. The charging device also has a wireless communication module or a wired communication module, to exchange data with the cloud server 80.

As can be seen, the electric motorcycle 10, the cellphone 20, and the charging device 40 all can be communicatively connected to the cloud server 80, to form a network of connected vehicles. Users can not only directly operate the electric motorcycle 10 and charging device 40, but also remotely monitor and control the access devices such as the electric motorcycle and charging device through mobile communication devices such as cellphones, to realize various intelligent application functions.

For example, the user can monitor, via the cellphone 20, an operation state of the electric motorcycle 10 and operation states of the charging device 40 and the battery 41 charged therein in real time. When the electric motorcycle 10 and the charging device 40 detect abnormalities, a warning message can be transmitted to the use's cellphone via the cloud server 80, such as a malfunction warning, an anti-theft warning, a battery charging abnormality or a charging completion warning, etc. Further, the user can also operate the cellphone 20 to remotely control the electric motorcycle 10 and the charging device 40, such as remotely locking or unlocking the electric motorcycle 10, remotely controlling charging parameters, charging connection and disconnection of the charging device, etc.

It should be noted that the above application scenario shown in FIG. 1 is only an example. In addition to the locomotive terminal and the cloud server, other devices connected to the cloud server can be any devices that can access the cloud server, such as PCs, smart watches, etc. Smart helmets, smart wearable devices (such as smart glasses), etc. supporting the vehicle can also be connected to the cloud server, thus the intelligent applications of the vehicle are enhanced.

Figure 2:
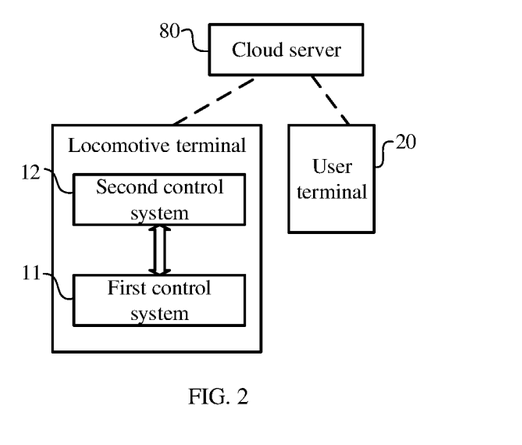
FIG. 2 is a diagram of an overall architecture of a vehicle intelligent control system based on a dual independent control system of the present application.

FIG. 2 is a diagram of an overall architecture of a vehicle intelligent control system based on a dual independent control system of the present application. As shown in FIG. 2, the locomotive terminal includes a first control system 11 and a second control system 12, which constitute a dual independent control system architecture. The dual independent control system architecture means that the first control system 11 and the second control system can operate independently. As described above, the independent operation in the present application means that the normal operations of basic operation modes of the first control system 11 do not depend on those of the second control system 12. Specifically, the basic locomotive control of the first control system 11 is not affected when the second control system 12 does not operate normally, except that the first control system 11 cannot obtain a control instruction from the second control system 12 or transmit operation state data of the vehicle to the second control system 12 in real time. However, the control instruction that cannot be obtained and the state data that cannot be transmitted do not affect the first control system 11 for the basic driving control of the vehicle. In addition, when not operating normally, the basic network interconnection of the second control system 12 is not affected, except that the second control system 12 cannot obtain the real-time operation state of the vehicle from the first control system 11 or cannot transmit additional external control instructions to the first control system 11.

When both the control systems operate normally, they can exchange data in real time. In order to implement the functions of the remote control-based intelligent application, the first control system 11 and the second control system 12 need to exchange data. The first control system 11 may also be referred to as a bottom-layer control system, whose basic functions refer to control functions of the existing vehicle, including real time monitoring of the operation state of the vehicle and controlling the operation of the vehicle, and receiving a control instruction from the second control system 12 to implement intelligent application functions. The second control system 12, which may also be referred to as a top-layer control system, is mainly used to access the network of connected vehicles for data exchange, and is also used to implement direct information exchange (including controlling the display device to display the vehicle's operation status, information exchange with the smart helmet, etc.) between the locomotive terminal and the user.

Specifically, the first control system 11 needs to transmit at least part of the operation state data of the vehicle to the second control system 12 in real time, and the first control system 11 can also control the operation of the vehicle according to an internal preset instruction and a control instruction received from the second control system 12. In addition, the second control system 12 receives the data transmitted by the first control system 11 and can transmit at least part of the received data to the cloud server, and the second control system 12 can also receive a control instruction from the cloud server 80 and forward the control instruction therein for controlling the operation of the vehicle to the first control system 11.

The specific data or control instructions to be exchanged between the first control system 11 and the second control system 12 and between the second control system 12 and the cloud server in the present application may be designed differently depending on the specific type, application function, application environment, etc. of the vehicle, but should not be used as a limitation on the present application.

As shown in FIG. 2, the vehicle intelligent control system of the present application further includes a user terminal 20, which can also exchange information with the cloud server 80. The cloud server 80 can also transmit a control instruction from the user terminal 20 to the second control system 12. The second control system 12 can receive the control instruction from the user terminal 20 and transmit a control instruction that needs to be processed by the first control system 11 to the first control system 11 for remote control applications, such as remote locking for anti-theft.

The second control system 12 can also transmit the operation state data of the vehicle, including various operation state data of the vehicle, from the first control system 11 to the cloud server 80. It should be noted that the operation state herein includes the environmental state of the vehicle, the state of the whole vehicle and the state of each component, the state of the vehicle when driving, and the state of the vehicle in various modes, such as shutdown without starting, starting without driving, etc.

Figure 3:
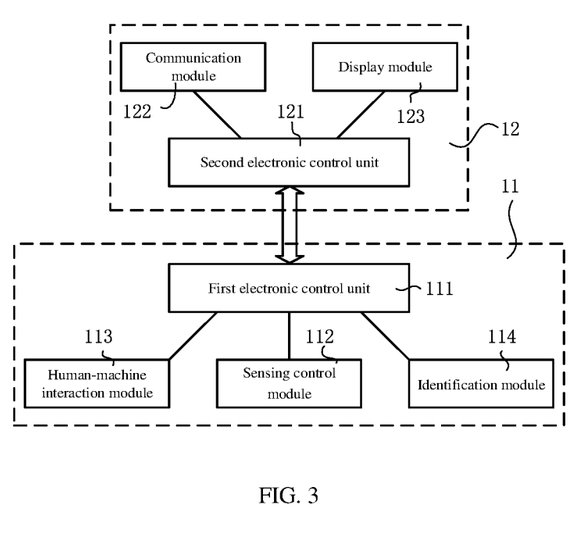
FIG. 3 is a block diagram of a structure of an embodiment of a vehicle intelligent control system based on a dual independent control system of the present application.

FIG. 3 is a block diagram of a structure of a specific embodiment of the vehicle intelligent control system based on a dual independent control system of the present application. As shown in FIG. 3, in this embodiment, the first control system 11 includes a first electronic control unit 111, a sensing control module 112, a human-machine interaction module 113, and an identification module 114. The second control system includes a second electronic control unit 121, a communication module 122, and a display module 123. The first electronic control unit 111 and the second electronic control unit 121 are connected for exchanging data. In one embodiment, the first electronic control unit 111 is connected to the second electronic control unit 112 via a controller area network bus (CAN Bus). In other embodiments, the first electronic control unit 111 and the second electronic control unit 121 can also be connected via other wires, which are not limited in the present application.

The two electronic control units are usually implemented by an electronic control unit (ECU), also known as a "vehicle computer", which includes a microprocessor (CPU), a memory (a ROM and a RAM), an input/output interface (I/O), an analog-to-digital converter (A/D), and a large-scale integrated circuit such as shaping and driving. However, the present application does not exclude other forms of electronic control units, as long as they have certain data storage and processing capabilities.

The first electronic control unit 111 of the embodiment is connected to a sensing control module 112, a human-machine interaction module 113 and an identification module 114. The sensing control module 112 is connected to various sensors of the vehicle, including battery sensors, vehicle environmental information sensors, electronic control environmental information sensors, etc., and collects, summarizes and pre-processes the detection data obtained from each sensor and transmits it to the first electronic control unit 111. The first electronic control unit 111 transmits the original data obtained from the sensors or the aggregated data obtained after processing the original data to the second electronic control unit 112 via the CAN Bus, and the second electronic control unit 112 transmits the data from the first electronic control unit 111 to the the cloud server 80.

The human-machine interaction module 113 and the identification module 114 belong to the application modules, which are used for human-machine interaction and identification of the user, respectively. In other implementations, it can be any other application module that is connected to the first electronic control unit 111, such as a light control module, an electronic switching module (in the case of double or multiple batteries), a FOC module, etc. Various application modules usually include sensors and actuators. For example, the identification module includes sensors for biometric identification, and circuits for locking and unlocking, etc. The present application is not limited to specific application modules. The first electronic control unit 111 may also transmit the original data obtained from the sensor of the each application module or the aggregated data obtained after processing the original data via CAN Bus to the second electronic control unit 112, and the second electronic control unit 112 transmits the data from the first electronic control unit 111 to the cloud server 80.

In this embodiment, the application module controlled by the first electronic control unit 112 mainly involves the basic driving operation functions such as a driving control, a battery management, an information collection and a human-machine interaction of the vehicle, so that the first electronic control unit 112 may also be referred to be as a driving monitoring unit. The second electronic control unit 112 are mainly used to control the networking and multimedia functions of the vehicle, including a connection to the cloud server 80, a communication and positioning, a control of the display apparatus, a control of audio and video, etc. Thus, the second electronic control unit 112 may also be referred to as a sensory interconnection unit.

In this embodiment, the second electronic control unit 121 is connected to a communication module 122 and a display module 123. One aspect of the communication module 122 is used to connect to the cloud server 80, which may be, for example, a mobile communication module supporting 4G communications, for transmitting data to or downloading control instructions from the cloud server 80. Another aspect of the communication module 122 is used to connect to the supporting device of the vehicle, such as a connection with the smart helmet via a Bluetooth module to obtain the state of the smart helmet and transmit the data to the smart helmet.

The display module 123 is used to control a display of the display screen of the vehicle. Obviously, in other implementations, the second electronic control unit 121 can also be connected to other application modules, such as a positioning module.

For the display module in the embodiment, the second electronic control unit 121 controls the display module based on the operation state data received from the first electronic control unit 111 to make the display screen to display the real-time operation state of the vehicle, and the second electronic control unit 121 may control the display of the display module 123 based on the user's operating instructions and/or control instructions from the cloud server.

In this embodiment, the display module can control the display screen to display various types of the data of the vehicle based on the data obtained from the first control system and the second control system, the data includes the driving speed of the vehicle, the battery level, the environment temperature, the state of the turn signals, etc. In other embodiments including the positioning module, the display module can also display a navigation map. In other words, the present application is not limited to the data that can be displayed by the display module and the display method of the display module.

Further, in this embodiment, the second electronic control unit 121 is further configured to control the communication module 122 to transmit the operation state data of the vehicle (e.g., data indicating that the turn signal is on) obtained by it to the cloud server 80, and the user terminal 20 connected to the cloud server can obtain the operation state data of the vehicle in real time. The current operation state of the vehicle can be displayed on the user terminal in real time.

Figure 4:
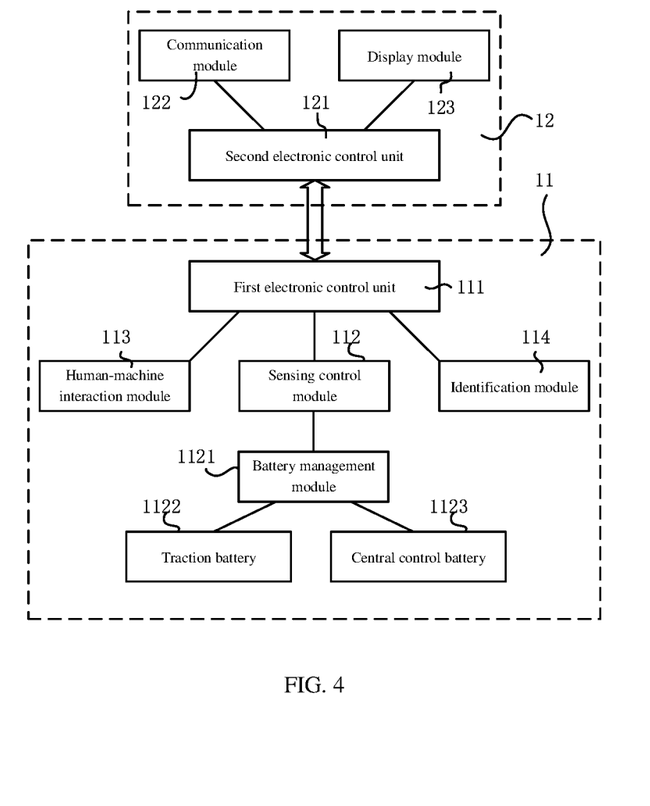
FIG. 4 is a block diagram of a structure of another specific embodiment of a vehicle intelligent control system based on a dual independent control system of the present application.

FIG. 4 is a block diagram of another specific embodiment of a vehicle intelligent control system based on a dual independent control system of the present application. As shown in FIG. 4, different from the previous embodiment, the sensing control module of this embodiment is connected to an independent battery management module 1121, which is configured to manage the battery system of the electric motorcycle. In this embodiment, the battery of the electric motorcycle includes a traction battery 1122 and a central control battery 1123. The traction battery 1122 is used to provide power to the power system of the locomotive and the central control battery is used to provide power to the electrical system of the locomotive. The power system is a system providing power to the vehicle for driving, including an electric motor, a transmission, an axle, and the like. The electrical system is an electrical device or electrical component of the vehicle, including all types of sensors and control units contained in the first control system and the second control system, and also including display modules, positioning modules, vehicle lighting devices, etc.

In this embodiment, an independent battery management module 1121 is used to manage the battery system, to more efficiently and more intelligently control the vehicle battery system. For the traction battery, this embodiment includes two batteries, the battery management module 1121 collects various states and information (including whether it is lost, etc.) of each battery, monitors the battery state, and manages the charging, discharging, and cycle times of the battery. For the central control battery, the battery management module 1121 also collects other various states of the battery such as the battery level of the battery, and manages the charging, discharging, and cycle times of the battery. The central control battery can be main battery and backup battery. The battery management module 1121 also manages the switching of the main and backup batteries.

As the number of electric motorcycle batteries increases and the demand for finer and more intelligent battery management increases, the battery management needs to obtain more information and processes more data, and thus needs more resource allocation. It is difficult to adapt to such changes in the prior art by using a generic module to manage the battery system. Therefore, the present application proposes to use an independent battery management module to manage the battery system of the vehicle in a unified manner. The battery management module can be implemented by a specialized data processing device, which facilitates more intelligent designs and application expansions. It also facilitates the optimization and upgrading of the wiring design between the battery systems by using the independent battery management module, such as designing special wiring or transmission methods for the wiring between the battery and the battery management module, to make the vehicle more robust and safer for the management and control of the battery.

Figure 5:
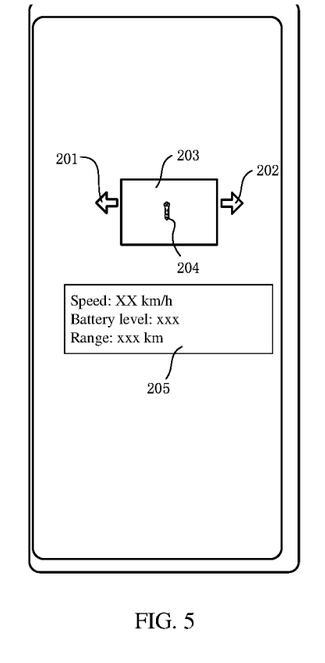
FIG. 5 is a schematic diagram of a display interface of a user terminal of an embodiment of a vehicle intelligent control system based on a dual independent control system of the present application.

FIG. 5 is a schematic diagram of a display interface of a user terminal of one embodiment of a vehicle intelligent control system based on a dual independent control system of the present application. One of the user terminals in this embodiment is a cellphone with an interface as in FIG. 5, which can be displayed when the cellphones of users other than the driver are authorized. The interface includes an area simulating a display apparatus of the electric motorcycle, and an electronic map 203 is displayed on the area. The electronic map 203 can display a vehicle icon 204 representing the position of the electric motorcycle. Turn indication signs, namely a left turn sign 201 and a right turn sign 202, are provided on both sides of the electronic map 203. A state information bar 204 is also provided below the simulated area of the display apparatus for displaying the real-time state of the vehicle.

When the electric motorcycle is driven by a driver, the electric motorcycle can obtain real time vehicle state data through the first control system 11, including the real-time state of each light of the vehicle, the speed of the vehicle, the remaining battery level in the vehicle, and the remaining mileage calculated by the first electronic control unit 111, etc. The first control system 11 transmits this real-time vehicle state data to the second control system 12. The second control system 12 can also obtain vehicle-related information from functional modules connected thereto, such as the geographic position information of the vehicle obtained from the positioning module. The second control system can thus combine the vehicle state data obtained from the first control system 11 with the geographic position information obtained from the positioning module and then transmit it to the cloud server 80. The cellphone connected to the electric motorcycle can obtain the geographic position information of the vehicle and the vehicle state data which includes the real-time state of the clamps, the speed of the vehicle, the remaining battery level of the vehicle, and the range calculated by the first electronic control unit 111, etc. as displayed in the FIG. 5.

It should be noted that FIG. 5 is only an example of a cellphone interface, and those skilled in the art may change and optimize the display of various data according to the information to be displayed. The display shown in FIG. 5 should not be interpreted as a limitation on the display method of the user terminal of the present application. For example, an animation of the vehicle icon moving on the image of the map, including the state of each light of the vehicle, can be displayed on the cellphone in real time. Such a collaborative remote display method not only enables the remote user to know the operation state of the vehicle in detail, but also enhances the interestingness of the vehicle to the user and improves the user experience.

Moreover, although FIG. 5 shows a display interface on a cellphone, the user terminal of the present application can be not only a cellphone but also various devices such as a PC, a tablet PC, a smart watch, smart glasses, etc. that can be used as a display medium and can access the cloud server. By a similar principle, various vehicle-related data can also be displayed on these user terminals.

Figure 6:
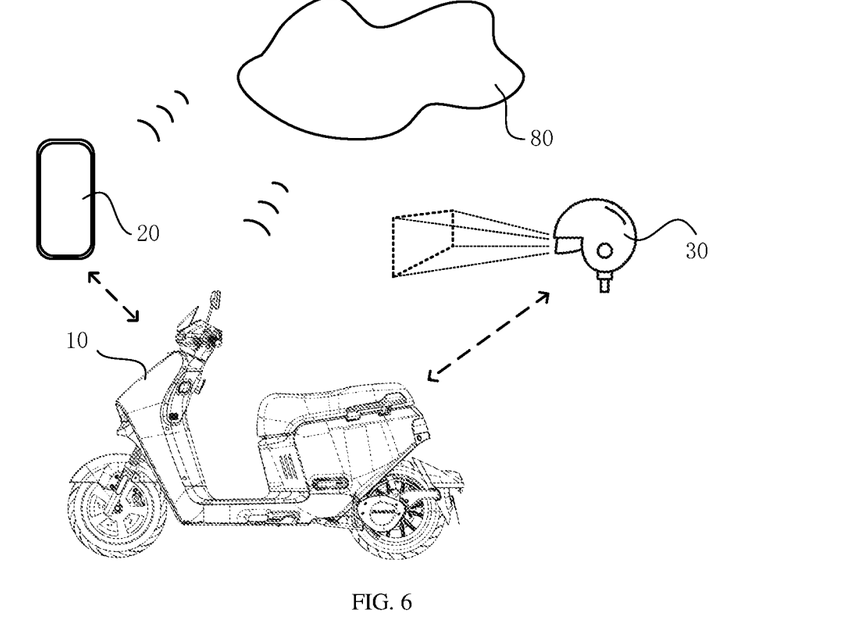
FIG. 6 is a schematic diagram of interaction of another embodiment of a vehicle intelligent control system based on a dual independent control system of the present application.

FIG. 6 is a schematic diagram of interaction of another embodiment of a vehicle intelligent control system based on a dual independent control system of the present application. As shown in FIG. 6, the vehicle intelligent control system further includes a smart helmet 10 with which the electric motorcycle 10 can communicate. Specifically, the communication module 122 of the second control system 12 of the vehicle intelligent control system further includes a communication unit, such as a Bluetooth communication unit, for communicating with the smart helmet. Thus, the second control system 12 can exchange data with the smart helmet 30. In this embodiment, the second control system 12 can control the display content based on the user's operating instructions and/or control instructions from the cloud server 80. For example, in a case that the user suspects that the vehicle is stolen, the user can remotely operate the user terminal 20 to turn off the display apparatus, or remotely operate the display apparatus to display a corresponding warning message, etc. For another example, other users when authorized (e.g., friends or family members of the driver) can also transmit messages via the user terminal (cellphone), and the messages are forwarded by the cloud server 80 to be received by the second control system 12 and displayed on the display apparatus or display module through the control of the second control system.

In addition, the second control system 10 can also interact with the smart helmet for data. Text messages can be projected on the screen. In another implementation, the second control system 12 converts the text message into an audio message and transmits the audio message to the smart helmet, and the driver can directly hear the audio message converted by the text message. Another implementation is that the second control system 10 forwards directly the received audio message to the smart helmet, so that the driver can hear the audio message through the helmet.

Figure 7:
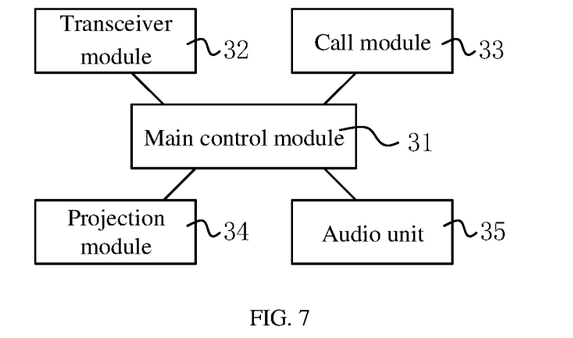
FIG. 7 is a block diagram of a structure of a smart helmet of the embodiment shown in FIG. 6.

FIG. 7 is a block diagram of a structure of a smart helmet 30 of the above embodiment. As shown in FIG. 7, the smart helmet 30 includes a main control module 31, a transceiver module 32, a call module 33, an audio unit 34 and a projection module 35. The main control module 31 is configured to control the operation of the functional modules and coordinate them, and to cache relevant data. The transceiver module 32 is configured to communicate with the communication module of the second control system and to transmit and receive data. The call module 33 is configured to receive and pre-process the user's voice input. The audio module 34 is configured to control the play of audio information, and the projection module 35 is configured to project information on the screen.

The transceiver module 32 of the smart helmet can receive various information from the electric motorcycle, such as vehicle state data obtained by the first control system, navigation voice information generated by the second control system, navigation instruction information (displayed by the projection screen), text messages received by the second control system from the cloud server (displayed by the projection screen, or converted into a voice by the second control system and transmitted), audio messages, etc.

The voice information received from the user by the call module 33 can be transmitted to the second control module 12, which can convert it into control instructions to enable the user to set up the entire system by voice. For example, the user can say "navigate to the train station" through the call module of the helmet, and when receiving the voice, the second control system opens its internal navigation application and sets the destination to the train station.

The audio module 34 can control the play of various types of audio, which includes the navigation voice from the second control system, the voice message received from the cloud server 80 or the voice message converted from the received text message.

The projection module 35 is configured to project various types of information that can be displayed visually, including the vehicle state data obtained by the first control system, the navigation indication information generated by the second control system, the information received by the second control system from the cloud server, etc.

It should be noted that the smart helmet described in this embodiment is an example implementation of the present application, and any helmet that can communicate with an electric motorcycle and display or play information can be applied to the present application. In other words, each functional module of the above-mentioned smart helmet can be added or deleted according to different purposes.

It can be seen that the interaction between the vehicle and the smart helmet makes the functions of the vehicle intelligent control system of the present application more diversified and convenient, improves the user's feeling of intelligence, remote control, and enhances the user experience.

Figure 8:
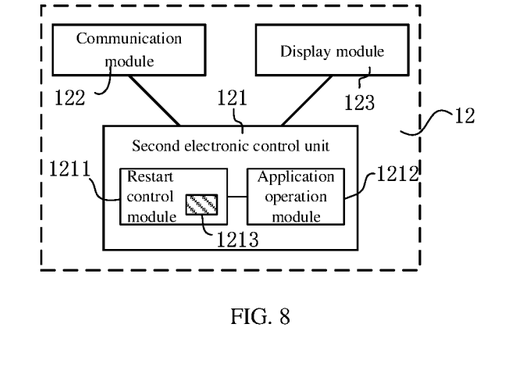
FIG. 8 is a block diagram of a structure of a specific embodiment of a second control unit in a vehicle intelligent control system based on a dual independent control system of the present application.

FIG. 8 is a block diagram of a structure of a specific embodiment of a second control unit in a vehicle intelligent control system based on a dual independent control system of the present application. As shown in FIG. 8, the second electronic control unit 121 includes a restart control module 1211 and an application operation module 1212. The application operation module 1212 is configured to store, install and operate various applications, and the restart control module 1212 is configured to control the automatic restart of the application operation module 1212. In one embodiment, the application operation module can be installed with an independent operation system, such as Android, whereby various applications can be installed and updated on the operation system, to facilitate the addition of new features and the upgrade of existing features.

Since the application operation module 1212 may support the operation of multiple intelligent applications simultaneously, it may consume more system resources, so it may stop operating (or "crash") under certain circumstances due to operating errors, such as overflowing due to insufficient internal storage space. Considering that it is not easy for users, especially drivers who are driving, to restart without affecting safety, the present application proposes a set for automatically restarting. That is, there is a restart control module 1211 connected to the application operation module 1212, which can be implemented by a microprocessor (MCU) for monitoring in real time whether the application operation module 1212 of the second electronic control unit 121 crashes, and when crashing, the application operation module portion is controlled to restart.

Further, the restart control module 1211 also controls the restart process. Considering that data may be interrupted during crashing and restarting, the restart control module 1211 in the embodiment includes a first data storage module 1213, which may be implemented, for example, by a RAM. The data reported by the first electronic control unit or the control instructions transmitted by the cloud server are first cached in the first data storage module 1213 of the restart control module, and then transmitted to the application operation module 1212.

Thus, if the restart control module 1211 detects that the application operation module 1212 crashes, and in a crashing state or in the process of restarting, when the second electronic control unit 121 receives the data reported by the first electronic control unit 111 or the control instruction from the cloud server 80, the restart control module caches the reported data or transmitted control instruction in the first data storage module (e.g., a RAM). When the application operation module 1212 starts normally, the restart control module 1211 re-transmits the data in the first data storage module 1213 to the application operation module 1212.

As can be seen, with this automatic restart function, vehicles such as an electric motorcycle can restart quickly to restore corresponding functions even if the upper control system (the second control system) does not operate normally under special circumstances, which is of great help to improve the stability of the system and the safety of the vehicle.

By the above description of the implementation, it is easily understood by those skilled in the art that the present application can be implemented by hardware capable of executing a specific computer program, such as the system of the present application, and the electronic processing unit, a server, a client, a cellphone, a control unit, a processor, etc. contained in the system, and that the present application can also be implemented by a vehicle containing at least part of the above system or components. The present application can also be realized by computer software executing the method of the present application, such as control software executed by a microprocessor, an electronic control unit, a client, a server terminal, etc. at the locomotive terminal. However, it should be noted that the computer software for executing the method of the present application is not limited to being executed by one or a specific hardware entity, but can also be implemented by non-specific hardware in a distributed manner, for example, some of the method steps of the computer program execution can be executed on the locomotive terminal and another part can be executed in a mobile terminal or smart helmet, etc.

For computer software, the software product may be stored in a computer-readable storage medium (which may be a CD-ROM, USB flash drive, mobile hard drive, etc.) or on a network, the software product includes a number of instructions to enable a data processing device (which may be a personal computer, a server, or a network device, etc.) to perform the above method according to the present application. The computer readable storage medium may include a data signal propagated in the baseband or as part of a carrier wave carrying readable program code. Such propagated data signals may take a variety of forms, including but not limited to electromagnetic signals, optical signals, or any suitable combination of the foregoing. The readable storage medium may also be any readable medium other than a readable storage medium that transmits, propagates, or transmits a program for use by or in conjunction with an instruction execution system, device, or components. The program code contained on the readable storage medium may be transmitted using any suitable medium, including but not limited to wireless, wired, optical, RF, etc., or any suitable combination of the foregoing.

The program code for performing the operations of the present application may be written in any combination of one or more programming languages. The programming languages include object-oriented programming languages—such as Java, C++, etc., and also include conventional procedural programming languages—such as "C" language or similar programming languages. The program code may be executed entirely on the user computing device, partially on the user device, as a stand-alone package, partially on the user computing device and partially on the remote computing device, or entirely on the remote computing device or server. In a case of involving a remote computing device, the remote computing device may be connected to the user computing device via any kind of network, including a local area network (LAN) or a wide area network (WAN), or may be connected to an external computing device (e.g., using an Internet service provider to connect via the Internet).

The specific embodiments described above provide a further detailed description of the objects, technical solutions and beneficial effects of the present application. It should be understood that the above description is only a specific embodiment of the present application and is not intended to limit the present application, and any modifications, equivalent replacements, improvements, etc. made within the spirit and principles of the present application shall be included in the protection scope of the present application.

What is claimed is:

1. A vehicle intelligent control system based on a dual independent control system, comprising a locomotive terminal and a cloud server both exchanging information with each other, wherein
the locomotive terminal comprises a first control system and a second control system both being operable independently and capable of exchanging data with each other in real time, and normal operations of basic operation modes of the first control system do not depend on those of the second control system, and when both the control systems operate normally, they can exchange data in real time;
the first control system monitors an operation state of a vehicle in real time and transmits at least part of operation state data to the second control system in real time, wherein the first control system includes a first electronic control unit and a sensing control module, the sensing control module is connected to various sensors of the vehicle and collects, summarizes and pre-processes the detection data obtained from each sensor and transmits it to the first electronic control unit, the first electronic control unit transmits the original data obtained from the sensors or the aggregated data obtained after processing the original data to the second electronic control unit via the CAN Bus, the application module controlled by the first electronic control unit involves the basic driving operation functions including a driving control, a battery management, an information collection and a human-machine interaction of the vehicle, the first electronic control unit exchanges data with the second electronic control unit in real time; and the first electronic control unit controls driving of the vehicle independent of data transmitted by the second electronic control unit;
the first control system controls an operation of the vehicle according to an internal preset instruction and a control instruction received from the second control system; and
the second control system receives data transmitted by the first control system and transmits at least part of the received data to the cloud server, wherein the second control system includes a second electronic control unit, the second electronic control unit transmits original data obtained from the sensors or aggregated data obtained after processing the original data from the first electronic control unit to the cloud server, and the second electronic control unit controls the networking and multimedia functions of the vehicle; and the second control system receives a control instruction from the cloud server and forwards the control instruction for controlling the operation of the vehicle to the first control system.

2. The vehicle intelligent control system based on a dual independent control system according to claim 1, further comprising: a user terminal capable of exchanging information with the cloud server; wherein
the cloud server is configured to transmit a control instruction from the user terminal to the second control system.

3. The vehicle intelligent control system based on a dual independent control system according to claim 2, wherein the second control system transmits the operation state data obtained to the cloud server; and the user terminal connected to the cloud server obtains the operation state data to display a current operation state of the vehicle on the user terminal in real time.

4. The vehicle intelligent control system based on a dual independent control system according to claim 1, wherein the second control system comprises a display module provided in the vehicle for displaying the operation state data.

5. The vehicle intelligent control system based on a dual independent control system according to claim 4, wherein the second control system further controls a display of the display module according to control instructions from the cloud server and/or user's operating instructions.

6. The vehicle intelligent control system based on a dual independent control system according to claim 4, wherein the second control system comprises a positioning module provided in the vehicle for obtaining geographic position information of the vehicle; and
the display module is further configured to display the geographic position information.

7. The vehicle intelligent control system based on a dual independent control system according to claim 6, wherein the second control system transmits the geographic position information to the cloud server; and
a user terminal connected to the cloud server obtains the geographic position information for displaying a geographic position of the vehicle in real time.

8. The vehicle intelligent control system based on a dual independent control system according to claim 1, wherein the first control system further comprises a sensor for obtaining the operation state data of the vehicle, and the first electronic control unit controls the operation of the vehicle based on the operation state data obtained by the sensor.

9. The vehicle intelligent control system based on a dual independent control system according to claim 1, wherein
the second electronic control unit is further configured to transmit to the cloud server data obtained by itself and/or data from the first electronic control unit.

10. The vehicle intelligent control system based on a dual independent control system according to claim 1, wherein the first electronic control unit is connected to at least one of following modules: a sensing control module, a human-machine interaction module and an identification module.

11. The vehicle intelligent control system based on a dual independent control system according to claim 10, wherein the sensing control module is connected to a battery management module, and the battery management module is configured to control a battery system of the vehicle.

12. The vehicle intelligent control system based on a dual independent control system according to claim 1, further comprising: a smart helmet, the second electronic control unit being capable of exchanging data with the smart helmet to transmit data obtained from the first control system, the second control system and/or the cloud server to the smart helmet; and
the smart helmet being configured to display and/or play the obtained data.

13. The vehicle intelligent control system based on a dual independent control system according to claim 12, wherein the smart helmet comprises a projection module for visually displaying information from the second electronic control unit.

14. The vehicle intelligent control system based on a dual independent control system according to claim 1, wherein the second electronic control unit comprises a restart control module and an application operation module;

the application operation module is configured to store, install and operate various applications; and the restart control module is configured to control the application operation module to restart automatically.

15. The vehicle intelligent control system based on a dual independent control system according to claim 14, wherein the restart control module comprises a first data storage module; and data reported by the first electronic control unit to the second electronic control unit or control instructions transmitted by the cloud server to the second electronic control unit are cached in the first data storage module and then transmitted by the restart control module to the application operation module.

16. A vehicle, comprising a vehicle body and a vehicle control system, wherein the vehicle control system comprises the vehicle intelligent control system based on a dual independent control system according to claim 1.

* * * * *